May 8, 1962  E. HOSTETLER ETAL  3,033,163
MECHANICAL POULTRY FEEDER
Filed Sept. 29, 1960  7 Sheets-Sheet 1

INVENTORS
ELDON HOSTETLER
LAWRENCE A. MYERS
BY
Kimmel & Crowell
ATTORNEYS

May 8, 1962 E. HOSTETLER ETAL 3,033,163
MECHANICAL POULTRY FEEDER
Filed Sept. 29, 1960 7 Sheets-Sheet 5
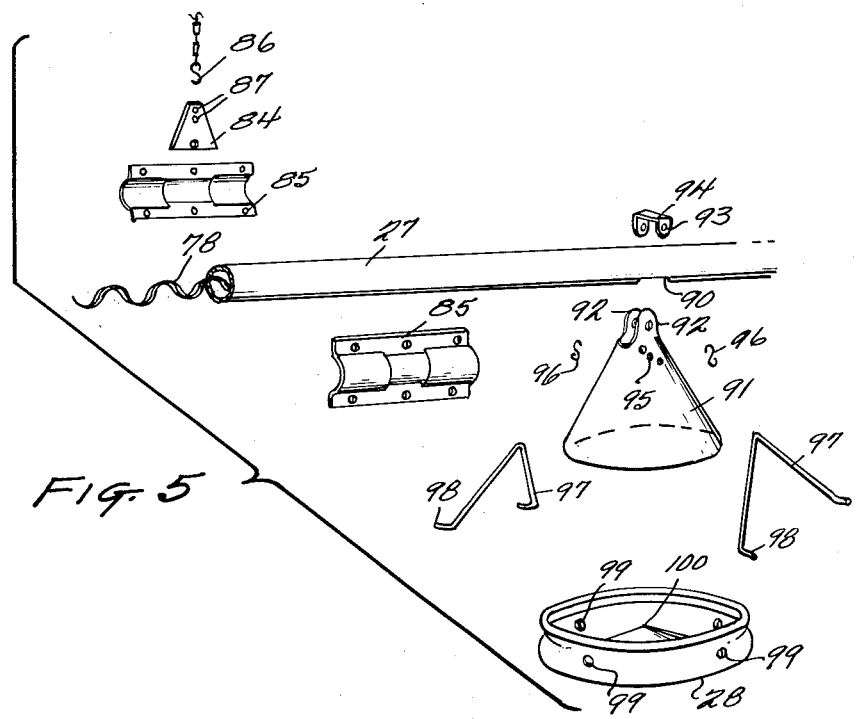
FIG. 5
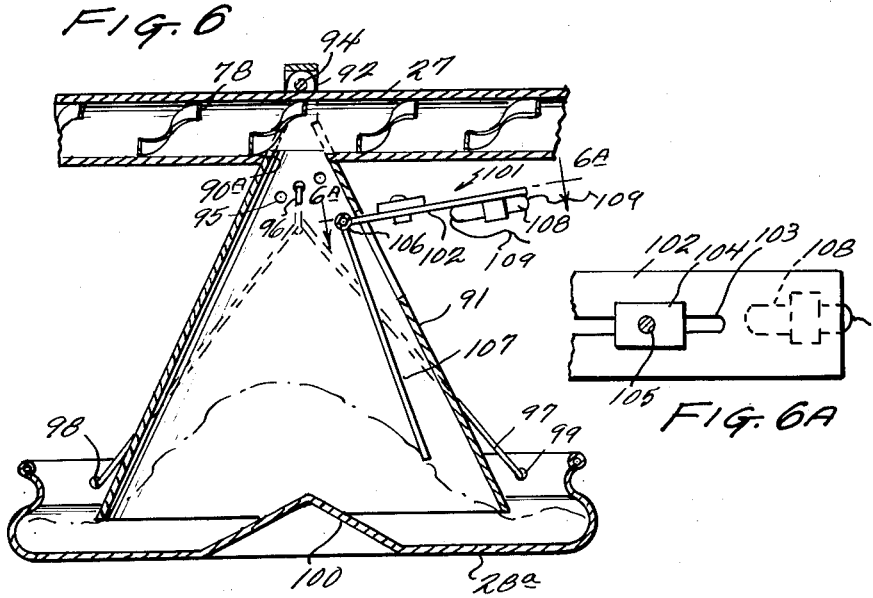
FIG. 6
FIG. 6A
INVENTORS
ELDON HOSTETLER
LAWRENCE R. MYERS
BY
Kimmel & Crowell
ATTORNEYS

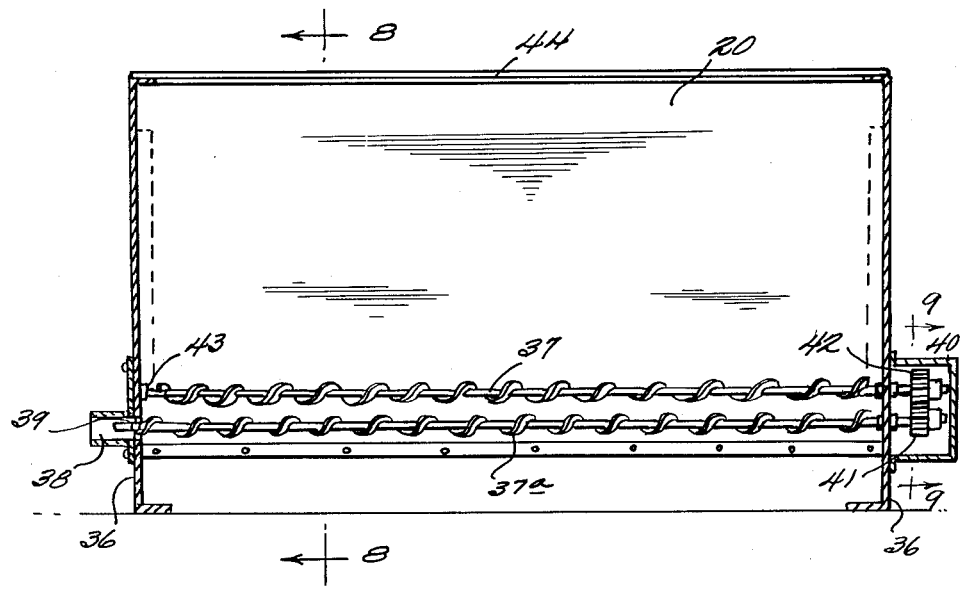
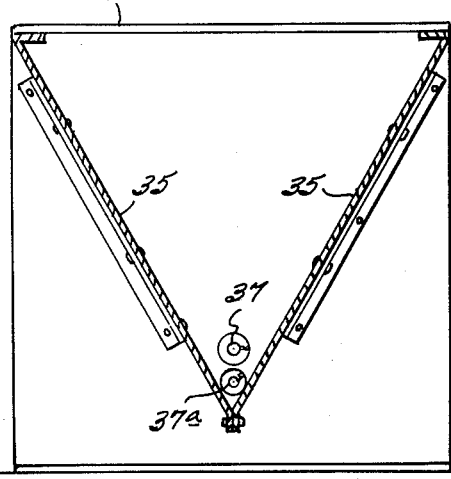
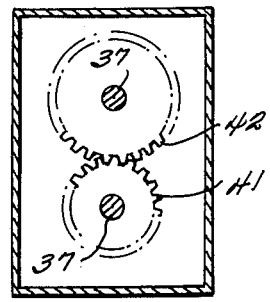

May 8, 1962 E. HOSTETLER ETAL 3,033,163
MECHANICAL POULTRY FEEDER
Filed Sept. 29, 1960 7 Sheets-Sheet 7
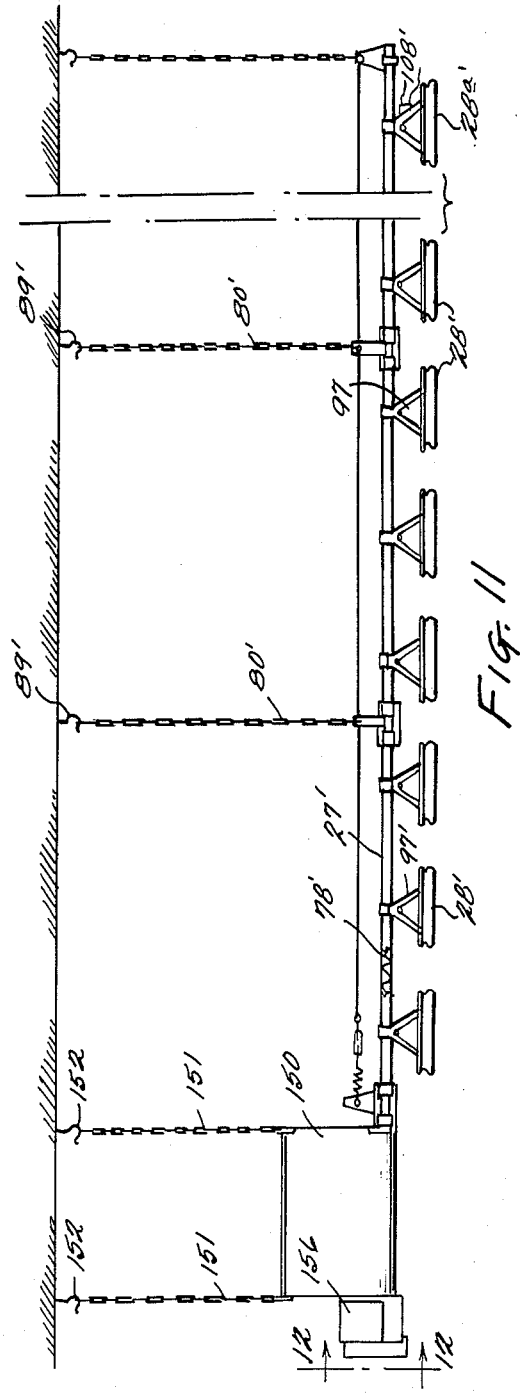
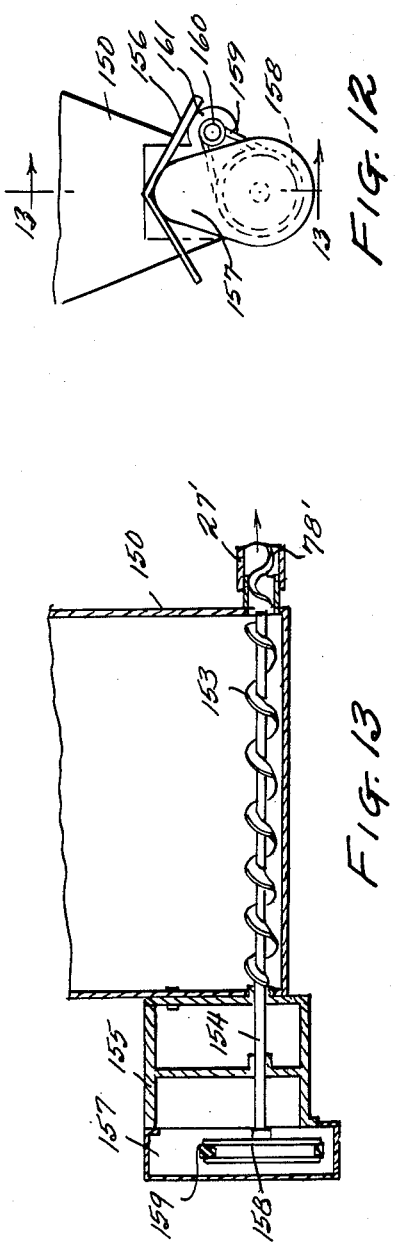
INVENTORS
ELDON HOSTETLER
LAWRENCE A. MYERS
BY
Kimmel & Crowell
ATTORNEYS

United States Patent Office 3,033,163
Patented May 8, 1962

3,033,163
MECHANICAL POULTRY FEEDER
Eldon Hostetler, Middlebury, and Laurence A. Myers, Milford, Ind., assignors to Chore-Time Equipment, Inc., Milford, Ind.
Filed Sept. 29, 1960, Ser. No. 59,312
7 Claims. (Cl. 119—52)

This invention relates to a mechanical poultry feeder, and has as its primary object the provision of an improved mechanical feeder which will provide fresh clean feed of uniform mixtures to all feeding areas in a poultry house, and will accommodate a relatively large number of birds with a minimum of crowding in a comparative minimum of space.

An additional object of the invention is the provision of such a mechanical feeder which will supply feed to all the feeding areas with a minimum amount of time and effort.

Still another object of the invention is the provision of such a feeder comprising a relatively large number of separate feeding lines so arranged that all or part of the lines may be installed, operated, or repaired independently with maximum flexibility as to arrangement and operation.

An additional object of the invention is the provision of an improved circular feeding tray, associated with the mechanical feeder of the instant invention so arranged as to provide more available space for birds to feed than is normally available in the conventional type of trough feeders, which will at the same time provide minimum restriction to the free movement of the birds.

Still another object of the invention is the provision of a device of this character which may be readily moved out of the area or out of the way when not in use, or when other activities such as cleaning out the house, catching the birds or spreading clean litter is taking place.

Still another object of the invention is the provision of means whereby the feeder trays or troughs may be readily adjusted to the height of the birds as the birds grow.

An additional object of the invention is the provision of a mechanical feeder which is complete, but which is relatively simple in construction, and practical for installation in smaller poultry houses as well as in the larger commercial houses.

A still further object of the invention is the provision of such a feeding device which provides a continuous supply of fresh clean feed of uniform mixtures to all parts of the poultry house to a degree not possible with known or existing feeding devices such as chain and trough type.

A further object of the invention is the provision of such a device wherein no feed that is exposed to the birds or dirt and litter in the house is returned to the hopper supply, such feed material as is recirculated in the distribution system being completely fresh and previously unexposed to the birds or to dirt and litter.

A further object of the invention is the provision of an improved circular cone and pan assembly for use as an individual unit of the device which has a substantial capacity sufficient to feed a relatively large number of birds, but which is not so great as to allow the feed material to become stale or dried out before it is consumed in a house with normal bird operation.

A still further object of the invention is the provision of means including an open center auger helix which will deliver the same mixture of feed material to all of the pans on a particular line without mechanically separating the feed material with respect to particles by weight or size, in contrast with the chain and trough type feeders which move the feed material through the trough so that the birds eating from the trough closest to the outlet side of the hopper consume the feed particles of their choice, while birds eating from the trough farther away from the supply have only picked over feed material and, therefore, different nutritional level.

An additional object of the invention is the provision of an arrangement of individual circular feeding pans whereby the tendency of the birds to rush to the portion of the trough with the fresher more complete ration, as is the case with the chain and trough feeders, thus crowding out the weaker or more timid birds, is obviated.

Still another object of the invention is the provision of such a device comprising an arrangement of circular pans along the feeder line of such diameter and spacing as to provide more space per linear foot of line for the birds to eat from. This is due to the taper of the body of the bird from its head to the widest body section, the arrangement of the circular pans permitting more birds to stand and eat around the circular pan than can stand side by side from an equivalent length of trough.

An additional object of the invention is the provision of an arrangement of spaced circular pans supported at a proper height from an overhead support so that the birds may walk freely between and under the pans thus allowing considerable freedom of movement to the birds and allowing the young birds to get to and from heated brooding areas, water and feed, with a minimum of difficulty.

A more specific object of the invention is the provision of a means for adjusting an entire line of feeder pans from a single winch arrangement so that a complete line can be adjusted by means of one operation, either for altering the height of the feeding pans as the birds grow, or for completely lifting the line from the floor area to permit access to the floor area for other purposes.

An additional specific object of the invention is the provision of switch means associated with the last pan along the feed line so arranged as to automatically cut off the supply of feed when the last pan is filled.

Still other objects reside in the combination of elements, arrangements of parts, and features of construction, all as will be more fully pointed out hereinafter, and disclosed in the accompanying drawings wherein there is shown a preferred embodiment of this inventive concept.

In the drawings:
FIGURE 1 is a side elevational view of a single feeder line supplied with feed through the system of the instant invention.

FIGURE 5 is an exploded perspective view showing the individual assembly of a feed pan assembly together with the auger feed assembly.

FIGURE 6 is an enlarged vertical sectional view taken substantially through the center line of one of the end feeding pans disclosing the switching arrangement associated therewith.

FIGURE 6a is an enlarged sectional view taken substantially along the line 6a—6a of FIG. 6 as viewed in the direction indicated by the arrows.

FIGURE 7 is an enlarged vertical sectional view taken through the center line of the feed hopper showing the agitating augers therein.

FIGURE 8 is a sectional view taken substantially along the line 8—8 of FIG. 7 as viewed in the direction indicated by the arrows.

FIGURE 9 is an enlarged sectional view taken substantially along the line 9—9 of FIG. 7 as viewed in the direction indicated by the arrows.

FIGURE 10 discloses a wiring diagram for use with the apparatus.

Figure 1:
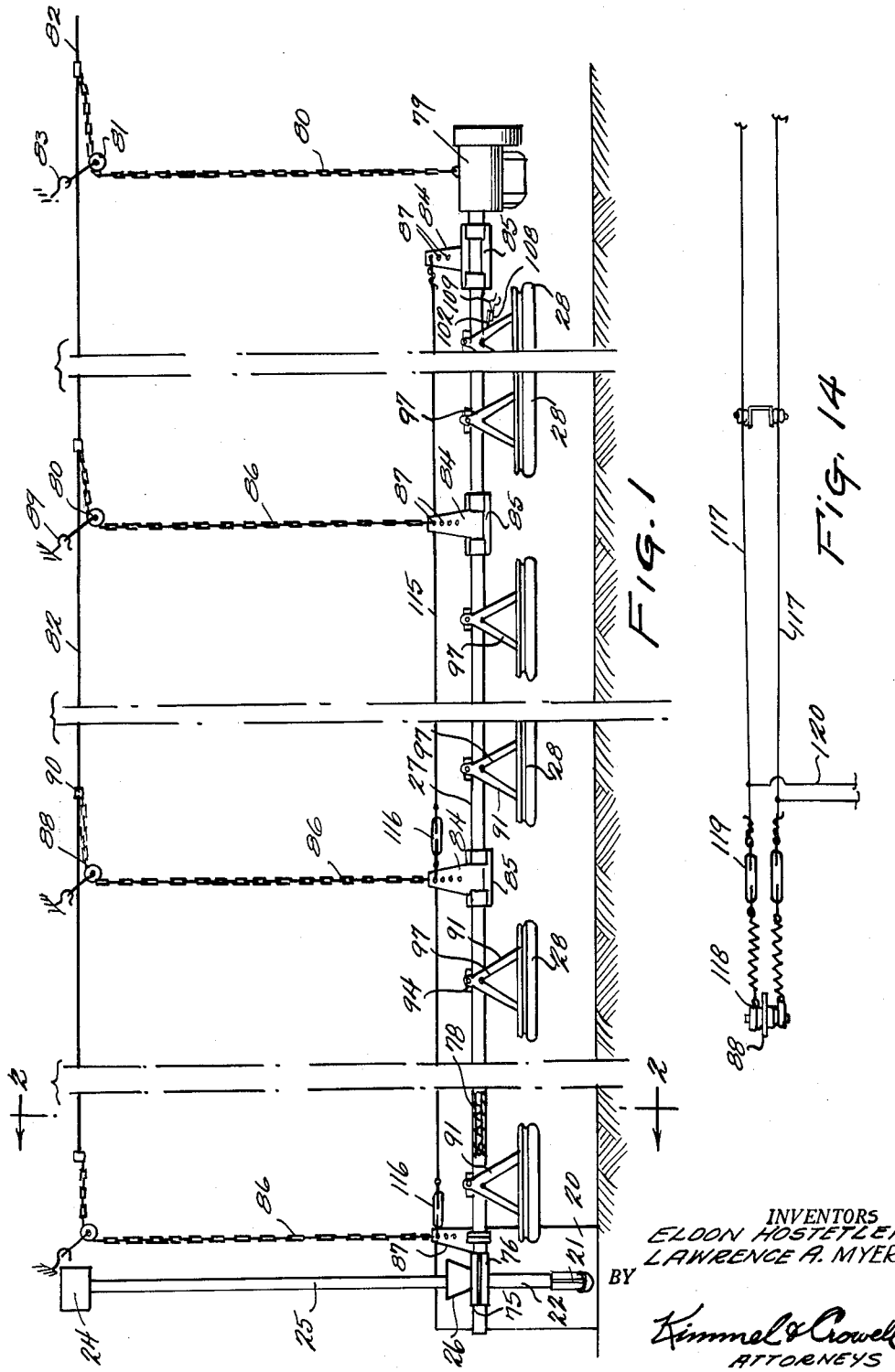

FIGURE 11 is a side elevational view similar to FIG. 1 showing a slightly modified form of construction.

FIGURE 12 is an enlarged elevational view taken substantially along the line 12—12 of FIG. 11.

FIGURE 13 is a sectional view taken substantially along the line 13—13 of FIG. 12 as viewed in the direction indicated by the arrows; and FIGURE 14 is a plan view of a modified or electrified form of guard wire employed in conjunction with the apparatus.

Similar reference characters refer to similar parts throughout the several views of the drawings.

Figure 2:
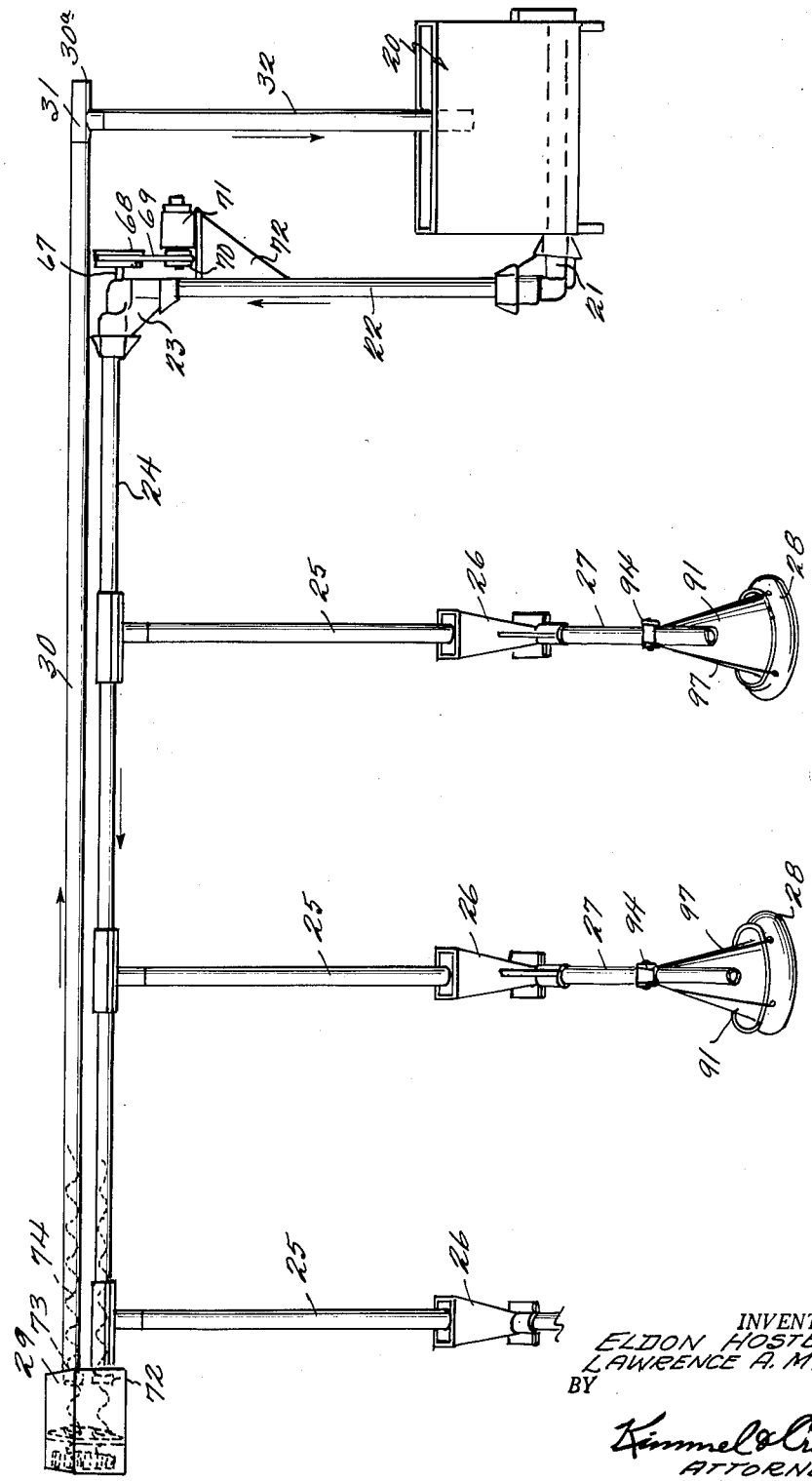
FIGURE 2 is a perspective view taken substantially along the line 2—2 of FIG. 1 as viewed in the direction indicated by the arrows, showing the feeding arrangement for a plurality of parallel feeding lines.

Having reference now to the drawings in detail, and more particularly to FIGS. 1 and 2, there is generally indicated at 20 a feed hopper, from which feed is conveyed, in a manner to be more fully described through an elbow 21, a vertical lift pipe 22, through a second elbow 23 to a horizontal feed line 24. Depending from horizontal feed line 24 are a plurality of vertical feed lines 25, each of which communicates with an individual feed intake box or hopper 26 for the feed line 27 of an individual row of feeding pans 28. Feed in the pipe 24 which is not disseminated through the vertical lines 25 is passed into a transfer box 29, and through a return line 30 either to fall out of the open end 30a of the tube or through an elbow 31 and depending pipe 32 to return by gravity to the hopper 20, thus minimizing dust.

Referring first to the hopper 20, as best shown in FIGS. 7, 8, and 9, the same is comprised of a pair of inclined side walls 35, which form a V, the walls being supported by suitable end plates 36. A pair of aligned parallel augers 37 and 37a extend longitudinally along the bottom of the V-shaped trough, the lower auger 37a comprising a feed auger extending in alignment with a feed outlet 38, and being connected to a feed auger 39 and driven thereby. The end of the trough opposite the outlet 38 is provided with a housing 40, into which the ends of the augers 37 and 37a extend. The auger 37a carries a gear 41, which meshes with the gear 42 carried by the shaft of auger 37, the other end of the shaft of auger 37 being journalled in a suitable journal 43 at the opposite end of the hopper, the arrangement thus being such that the rotation of the auger 37a similarly rotates the auger 37, to insure constant agitation of the feed in the bottom of the hopper. A suitable cover 44 may be provided for the hopper if desired.

Figure 3:
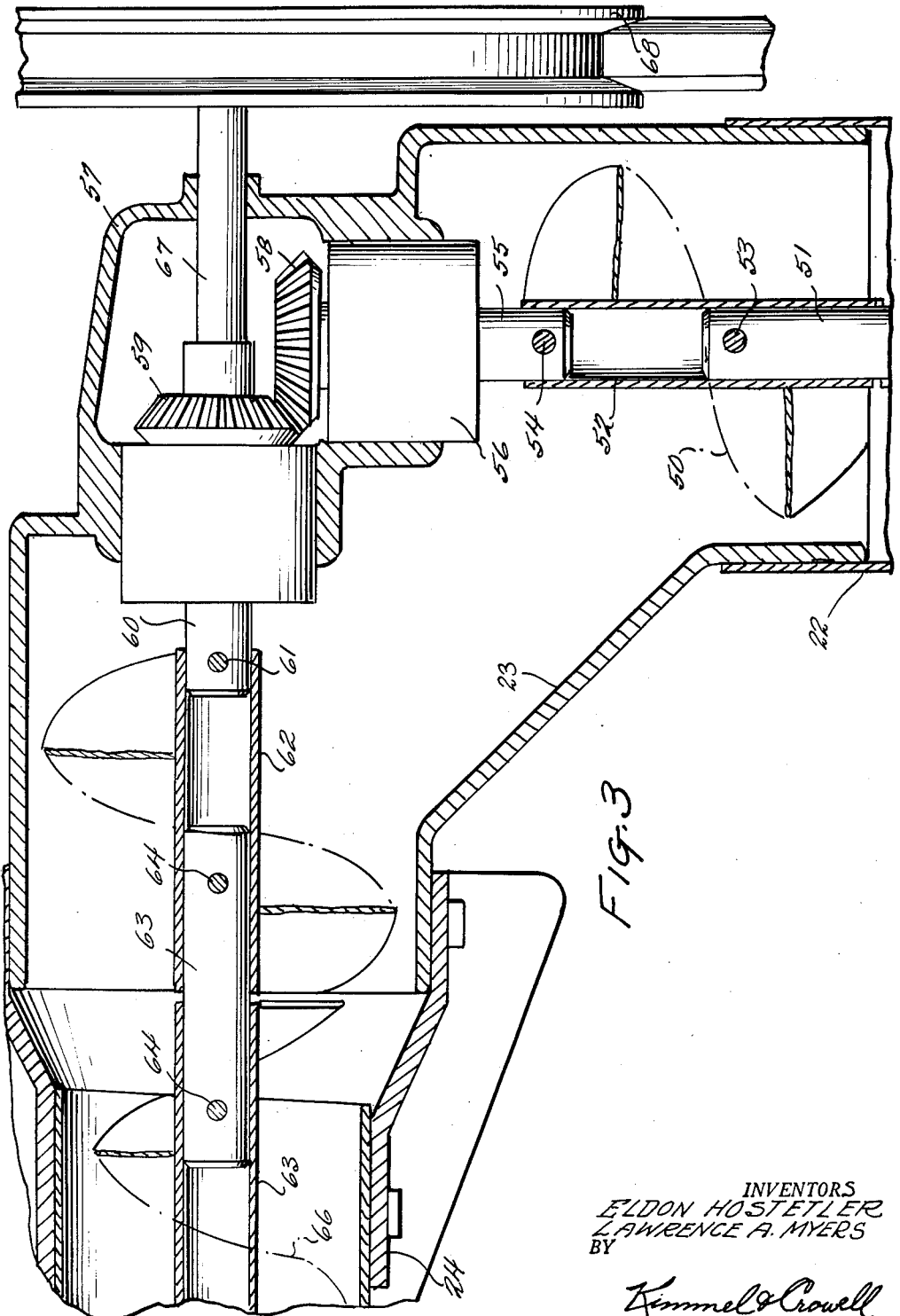
FIGURE 3 is an enlarged vertical sectional view through the power drive of the machine showing the arrangement of passing the feed through the feeder lines around substantially right angled corners.

The arrangement is such that the lower auger 37 rotates in a direction to carry feed into the pipe 38, where it engages the auger 39 interiorly of elbow 21. The elbow 21 is provided with a gearing system to be more fully described hereinafter which is driven by a vertical auger 50 in the upright tube 22. The vertical auger 50 includes, as best shown in FIG. 3 a shaft 51 which extends into a sleeve 52, being secured thereto by a pin 53, the sleeve being affixed as by means of a pin 54 to a shaft 55 which extends through a suitable bushing 56 into gear box 57. The shaft 55 carries a bevel gear 58, which is engaged by a second bevel gear 59. The bevel gear 59 is mounted on a shaft 60 which is pinned by means of a pin 61 to a sleeve 62, the sleeve 62 being connected by means of a shaft 63 and a pair of pins 64 to the sleeve 65 of a horizontal auger 66 which extends through the tubular feed line 24. Power is supplied to the entire system by means of a shaft 67 which is fixed to the bevel gear 59, and which extends outwardly of the gear box housing 57 and carries a pulley 68. The pulley 68 is driven by means of a belt 69 from the pulley 70 of a motor 71 which is suitably mounted as on a supporting bracket 72. The motor 71 may be of any desired size and power, and feels the entire system. The lower elbow 21 is substantially identical in construction to that previously described in connection with the elbow 23, and power is transmitted from the auger or helix 51 to the auger 39, and thence to the agitating augers 37 and 37a as previously described.

The feed is carried by the auger 66 evenly and smoothly through the horizontal line 24, a sufficient quantity of feed dropping through each vertical pipe 25 to supply feed to the intake box 26, from which it is conveyed through the pipe 27 to the feeding pans 28, in a manner to be more fully described hereinafter. Any feed in the line 24 which does not pass through the vertical feed pipes 25 is conveyed into a gear box 29, which includes a gear 72 which is mounted on a stub shaft extending from the end of auger 66, the latter in turn meshing with a gear 73 on stub shaft which is connected to and drives a return auger 74 in the return line 30. The return feed is thus carried to elbow 31, and falls into the return line 32, and thence back to the hopper 20, or alternately to the open end of line 30.

Figure 4:
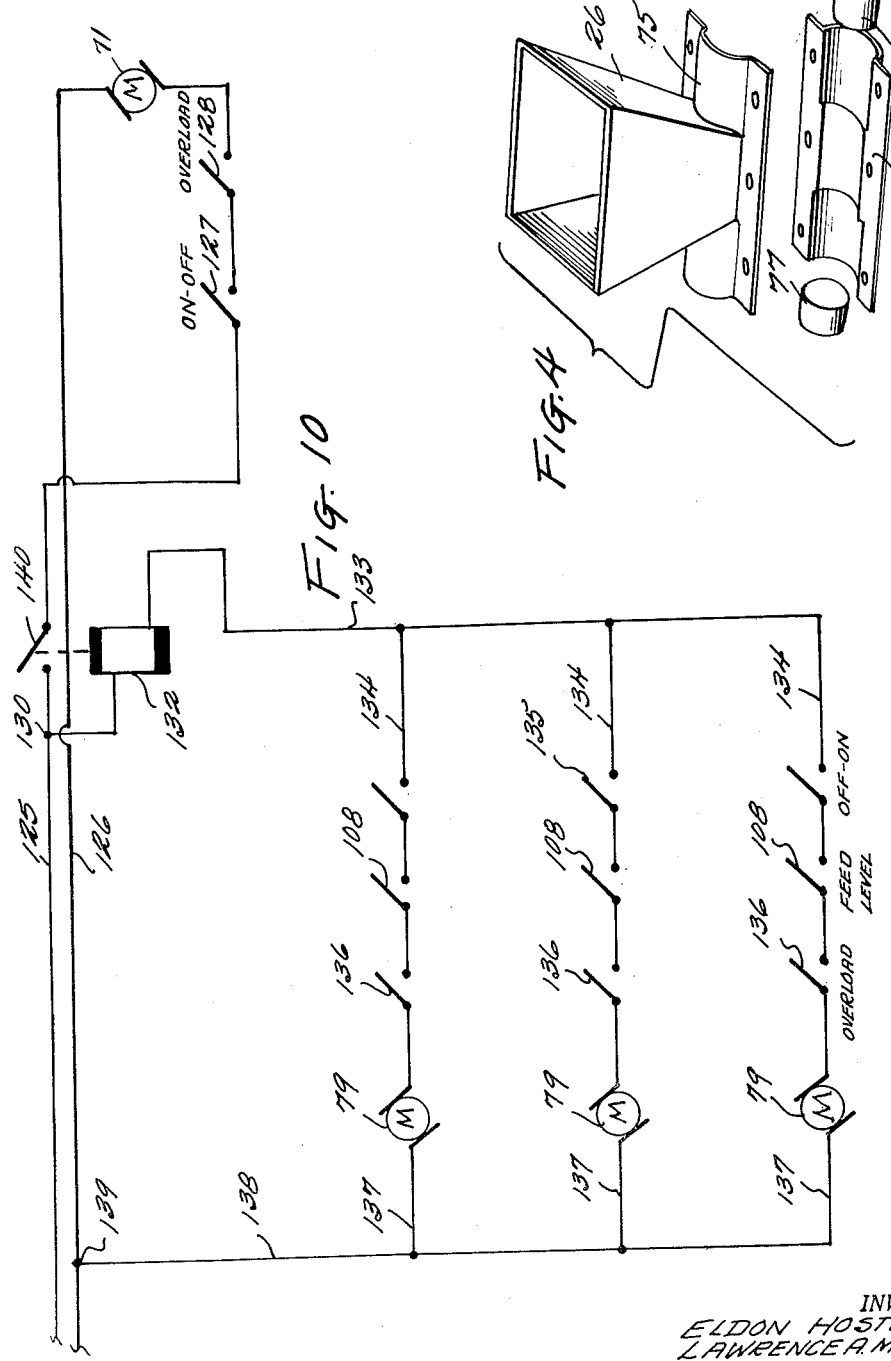
FIGURE 4 is a reduced exploded perspective view showing the feeder line feed intake box.

FIG. 4 discloses the arrangement of the feed box 26, which has an open bottom, and is fitted to a half round plate 75, which, in conjunction with an opposite half round plate 76, forms an arcuate clamp attached to box 26. The feed pipe is inserted in one end of this clamp but not sufficiently to cover the opening in box 26. A short extension pipe 77 having a closed end is fitted in the other end of the clamp to permit expansion of an auger helix 78 as the load changes and also to serve as a mechanical guard. The pipe 27 carries the auger 78, which extends the full length thereof, and is driven by an independent motor 79. The motor 79 is suspended by a chain 80 which passes over a pulley 81 and is connected to a line 82 which extends the full length of the pipe 27. The pulley 81 is suspended from a hook 83 from the ceiling or roof, if desired. At suitable spaced intervals along the pipe 27 supporting plates 84 are suitably clamped around the line as by means of half round plates 85. A chain 86 is connected to each of plates 84. Plates 84 are provided with aligned spaced openings 87 for selective adjustment of the height of a wire guard to be hereinafter described. Each chain 86 passes over a pulley 88 which in turn is supported by a hook 89 suspended from the ceiling, and the end of each chain 90 is attached to the line 82. The arrangement is thus such that by removing the individual vertical feed pipe 25, the line 82 may, by connection to a winch or the like, be moved to exert pressure on the several chains 86 and 80 to lift the entire assembly from a point relatively close to the floor to a point closely adjacent the ceiling. The advantages of such a single lifting arrangement in providing for the cleansing of the floor, or when catching birds, adjusting the height of feeder pens above the floor level for different sized birds or for any other desired purpose, will be readily apparent. The chains 86 may be individually adjusted as to height by running the chain through the uppermost opening 87 in plate 84 and attaching the end of the chain to a selected link, as by means of a conventional S hook.

Each of pipes 27 has positioned in the underside thereof a series of spaced openings 90a, beneath each of which is positioned a feed diffusing member 91 which, illustratively, is cone shaped, although a pyramid or other desired shape may be used provided with a pair of upstanding apertured ears 92, which are adapted to engage the apertured ears 93 of a clip 94, a suitable pin passed through the lined apertures serving to secure the cone 91 to the underside of the pipe.

The cone 91 is provided with a series of spaced apertures 95 on opposite sides thereof which are adapted to be engaged by the ends of oppositely disposed hooks 96. Hooks 96 support V-shaped supporting wires 97 having offset end portions 98 which are adapted to engage in oppositely disposed apertures in the bottom of the feed trays 28. As best shown in FIGS. 5 and 6, each feed tray is provided with a relatively flat cone 100 in the bottom thereof, which in combination with the cone 91 serves evenly to distribute the feed to the outer rim of the tray. It is to be noted that the bottom of cone 91 is spaced from the bottom of each tray 28, and spaced inwardly from the rim thereof to provide ready access to the food by the birds, adjustment of space between the tray 28 and cone 100 being permitted by apertures 95.

The end tray 28a of each series of trays is provided with a cutoff switch 101, which comprises a plate 102, having a slot 103 therein and a weight 104 adjustably held in the slot by means of a bolt 105, the plate 102 being mounted on a pivot 106 interiorly of its associated cone 91, and having secured thereto a depending plate 107 interiorly of the cone. A mercury switch 108 is connected by suitable leads 109 to any desired switching mechanism, which in turn connects with the motor 79 automatically to discontinue operation of the open center auger 78 when the feed in the end cone 91 has reached a level to force the panel or plate 107 outwardly to tilt the mercury switch 108 about its associated pivot.

A wire 115 provided with suitable adjusting turnbuckles 116 extends the full length of each pipe 27 being suitably connected at opposite ends to the supporting plates 84 for the purpose of preventing the chickens from roosting on the pipes 27.

FIG. 14 discloses a modified form of construction wherein wires 117 are arranged in spaced parallelism and connected through insulators 118 to the opposite end supporting plates 84. In this modification of the device adjusting turnbuckles 119 are provided for properly tensioning the wires, and a mild electric current is supplied to the wires 117 through leads 120, from any desired source, in order to impart a mild electric shock to any birds attempting to roost on the wires over the feed pipes 27.

FIG. 10 discloses a wiring diagram to be employed in a plurality of feed lines, wherein power lines 125 and 126 extend to the motor 71. Hot line 125 is provided with a manually actuated on and off switch 127, and a manually reset overload switch 128.

From the line 125 a terminal 130 is connected to a wire 131, which is connected to a relay coil 132, from which a line 133 leads to each of a plurality of feed lines 134, which extend through suitable manual off and on switches 135, feed level switches 108, as previously described, and overload switches 136 to motors 79, for individual control thereof. Lines 137 extend through suitable terminals to a return line 138 which is connected to a terminal 139 carried by the cold line 126. A relay switch 140 is positioned in line 125 and is actuated by coil 132.

FIGS. 11, 12, and 13 disclose a modified form of construction which is particularly adaptable to small installations or mono-line arrangements. In this form of construction a feed line 27' is provided with an internally positioned open center auger helix 78', the line 27' being provided with spaced slots which feed into cones 97' which supply feed pans 28', all substantially identical to that of the previous modification. A feed level cutoff switch 108' is also provided for the end tray 28a'.

In this modification the line 27' is supported by a plurality of chains 85, which are individually secured to hooks 89' supported individually from the ceiling. A hopper 150 is provided at one end of the feed line 27' and is supported by chains 151 suspended from hooks 152 in the ceiling. The hopper 150 tapers to a bottom V, as best shown in FIG. 12, and is provided with a feed auger 153. The auger 153 is directly connected to the auger 78' in feed line 27', and is driven by means of a shaft 154 which is positioned in a housing 155 carried by the end of a hopper 150. A V-shaped shield 156 protects the housing and its interior mechanism from any feed accidentally falling from the hopper 150 during feeding. A supplemental pulley housing 157 is provided which contains a pulley 158 secured to the end of shaft 154, the pulley 158 being driven by a belt 159, which in turn is driven by a shaft 160 driven by an electric motor 161, which is supplied with current from any desired source. The connections of the motor 161 are substantially identical to those described in connection with the motor 79, and the operation of the device is substantially the same in all major respects the exception being that there is herein provided a single line for use in small installations.

From the foregoing it will now be seen that there is herein provided an improved mechanical poultry feeder, which accomplishes all the objects of this invention and others, including many advantages of great practical utility and commercial importance.

As many embodiments may be made in this inventive concept, and as many modifications may be made in the embodiments hereinbefore shown and described, it is to be understood that all matter herein is to be interpreted merely as illustrative, and not in a limiting sense.

We claim:

1. A mechanical poultry feeder comprising, in combination, a main feed hopper, a feed supply line extending substantially vertically from said hopper, a primary horizontal feed line fixed to the free end of said vertically extending feed supply line, feed transfer means in communication with said primary feed line and said feed hopper, means in said vertical feed supply to convey feed from said hopper to said primary horizontal feed line, means in said horizontal feed line to convey feed therethrough, portions of said horizontal feed line defining at least one opening in the wall thereof, a vertically depending gravity feed pipe secured to said horizontal feed line in alignment with the opening therein, a secondary horizontal feed line disposed adjacent the free end of said gravity feed pipe and adapted to receive feed therefrom, portions of said secondary feed line defining a plurality of spaced openings through the wall thereof, feed trays secured to said secondary horizontal feed line below said openings, and means in said secondary feed lines to convey feed therethrough to be dispensed through the openings therein into said feed trays.

2. A mechanical poultry feeder as defined in claim 11 which includes a feed transfer box, said transfer box having portions defining a pair of spaced openings in one wall thereof, the free end of said primary horizontal feed line secured to the transfer box in alignment with one of said openings, a feed return line secured to said transfer box in alignment with the other of said pair of openings, the free end of said feed return line being open and terminating above said main feed hopper, a vertically depending pipe secured to said feed return line adjacent the open end thereof, said vertically depending pipe in communication with the interior of said feed return line and said main feed hopper, and means in said feed return line to convey feed from said transfer box to the free end thereof.

3. A mechanical poultry feeder as defined in claim 1 wherein said primary horizontal feed supply line includes a plurality of said vertically depending gravity feed pipes secured thereto in spaced relation, each of said gravity feed pipes in communication with the interior of said primary horizontal feed line, hoppers having outlets therein disposed below the free ends of said gravity feed pipes, a plurality of said secondary horizontal feed lines secured to said hopper outlets, each of said secondary horizontal feed lines having portions defining spaced openings therein, and means mounted on the free end of each of said secondary horizontal feed lines to drive the conveying means therein.

4. A mechanical feeder as defined in claim 3 wherein each of said secondary horizontal feed lines includes a plurality of support brackets secured thereto in spaced relation, a plurality of pulleys supported in vertically spaced relation over each of said secondary horizontal feed lines, chains each secured at one end to said support brackets and extending over said pulleys, means to draw said chains over said pulleys to raise and lower each of said secondary horizontal feed lines, its associated hopper, its drive means for the conveying means therein, and the feed trays fixed thereto.

5. A mechanical poultry feeder as defined in claim 1 wherein said main feed hopper includes end walls, side walls, and inclined bottom walls, one of said end walls having portions defining an outlet opening therein, a horizontally disposed feed auger adjacent the bottom of said hopper and in alignment with said outlet opening, an agitating auger in vertically spaced parallel relation to said feed auger, means to drive said feed auger, and means drivingly connecting said feed auger and said agitating auger.

6. A mechanical poultry feeder as defined in claim 1 which further includes a wire fixed to said secondary horizontal feed line in spaced parallel relation, said wire connected to a source of electric current to administer a mild shock to poultry to prevent the birds from roosting on said feed line.

7. A mechanical poultry feeder as defined in claim 1 wherein said secondary feed lines comprise elongated tubular members, and the means therein to convey feed therethrough comprising an open center auger helix.

References Cited in the file of this patent

UNITED STATES PATENTS

| | | |
|---|---|---|
| 2,335,173 | Corey | Nov. 23, 1943 |
| 2,681,639 | Littlefield | June 22, 1954 |
| 2,738,765 | Hart | Mar. 20, 1956 |
| 2,754,801 | Reese | July 17, 1956 |
| 2,865,328 | Hostetler | Dec. 23, 1958 |
| 2,942,574 | Golay | June 28, 1960 |
| 2,961,126 | Craig | Nov. 22, 1960 |